Figure 1:
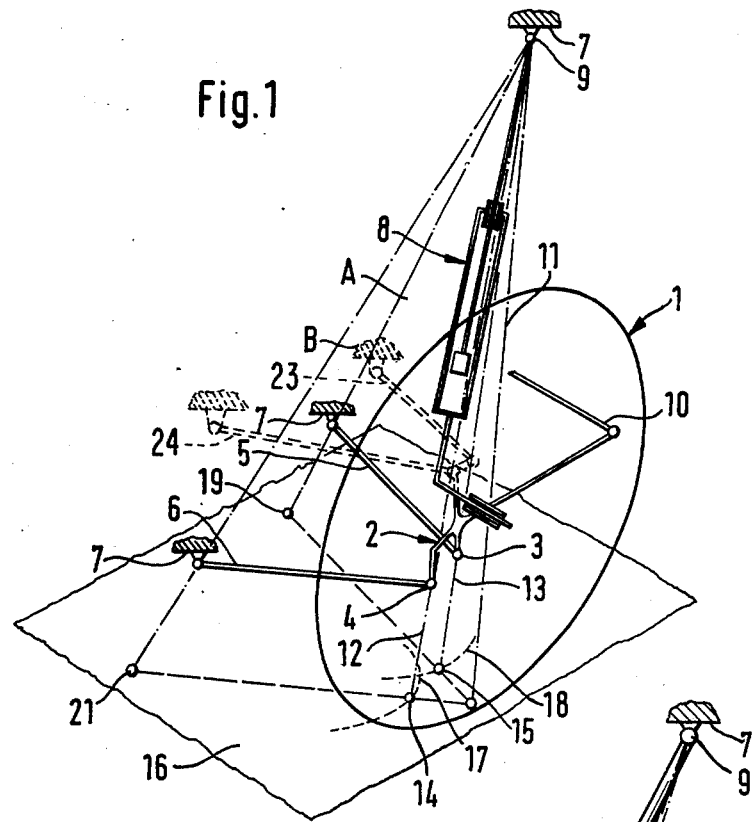

United States Patent [19]

Matschinsky

[11] 4,145,072

[45] Mar. 20, 1979

[54] INDEPENDENT SUSPENSION OF A STEERED WHEEL OF A MOTOR VEHICLE

[75] Inventor: Wolfgang Matschinsky, Munich, Fed. Rep. of Germany

[73] Assignee: Bayerische Motoren Werke Aktiengesellschaft, Fed. Rep. of Germany

[21] Appl. No.: 782,741

[22] Filed: Mar. 30, 1977

[30] Foreign Application Priority Data

Apr. 2, 1976 [DE] Fed. Rep. of Germany ....... 2614285

[51] Int. Cl.² .............................................. B60G 11/58
[52] U.S. Cl. .................................................. 280/668
[58] Field of Search ........................ 280/660, 661, 668

[56] References Cited
FOREIGN PATENT DOCUMENTS 1938850 9/1977 Fed. Rep. of Germany ........... 280/660

Primary Examiner—Joseph F. Peters, Jr.
Assistant Examiner—Donn McGiehan
Attorney, Agent, or Firm—Craig & Antonelli

[57] ABSTRACT

An independent suspension of a steered wheel of a motor vehicle, with a wheel carrier which for purposes of guidance of the wheel during the spring- and steering-movements is connected with the vehicle body by way of two lower guide members pivotally connected to the wheel carrier one behind the other in the lower area thereof as well as by means of a spring-leg rigidly connected with the wheel carrier and articulated to the vehicle body by way of an upper joint or by way of an upper triangular guide member; to obtain a castor angle, the ideal steering axis of the wheel is slightly inclined with respect to the vertical, as viewed in side view of the vehicle, whereby this ideal steering axis is formed by the intersection of the planes defined respectively by the axes of the two lower guide members and the upper joint; the two lower joints in which the lower guide members engage at the wheel carrier are thereby arranged at different heights in such a manner that the connecting line of these two lower joints, as viewed in side view, is also inclined with respect to the vertical in the same sense as the ideal steering axis.

11 Claims, 2 Drawing Figures

U.S. Patent

Mar. 20, 1979

4,145,072

INDEPENDENT SUSPENSION OF A STEERED WHEEL OF A MOTOR VEHICLE

The present invention relates to an independent suspension of a steered wheel of a motor vehicle, especially of a passenger motor vehicle, with a wheel carrier which for purposes of guidance of the wheel during the spring and steering movements is connected with the vehicle body by way of two guide members pivotally connected one behind the other, as viewed in the longitudinal direction of the vehicle, in its lower area as well as by means of a spring leg rigidly connected with the wheel carrier, by way of an upper joint or by way of an upper triangular guide member, whereby for purposes of obtaining a castor angle an ideal steering axis of the wheel slightly inclined to the vertical — as viewed in side view of the vehicle — is provided which is represented by the line of intersection of the planes which are defined by the longitudinal axes of the two guide members and the respective upper joint point.

Such wheel suspensions are known in the prior art (compare German Offenlegungsschrift No. 1,938,850, FIG. 6 or FIGS. 10 to 13). By means of such suspensions, the ideal steering axis can be placed far into the wheel-dish without, however, impairing thereat the installation, for example, of a sufficiently dimensioned brake. The placement of the ideal steering axis into the concave wheel-disk enables the attainment of a small or negative steering-roll-radius with the known advantages especially with differently acting brakes.

Undesirably high steering forces still occur nonetheless with these wheel suspensions, especially during standstill of the vehicle, which have their cause in transverse movements of the point of contact of the tire with the road surface during the steering.

The present invention is now concerned with the task to improve an independent suspension of a steered wheel of a motor vehicle of the aforementioned type while avoiding these disadvantages in such a manner that the steering forces are further reduced when the vehicle stands still or is being parked.

The underlying problems are solved according to the present invention in a wheel suspension of the type of construction described hereinabove in that the two lower joint or articulation points, in which the two guide members engage at the wheel carrier, are so arranged at different heights that, as viewed in side view of the vehicle, the connecting line of these two joints is inclined with respect to the vertical in the same sense as the ideal steering axis. Owing to this measure, it is possible to move the two effective axes of rotation defined respectively by the lower guide joints and the upper joint very close to one another — as viewed in side view of the vehicle. This leads, as well be explained more fully hereinafter by reference to the embodiment of the present invention illustrated in the drawing to a marked reduction of the steering forces, especially with a standing vehicle.

Accordingly, it is an object of the present invention to provide an independent wheel suspension of a steered wheel of a motor vehicle which avoids by simple means the aforementioned shortcomings and drawbacks encountered in the prior art.

Another object of the present invention resides in an independent wheel suspension of a steered wheel of a motor vehicle in which the steering forces which are required to turn the wheels while the vehicle stands still or is being parked, are further considerably reduced.

A further object of the present invention resides in an independent wheel suspension of the type described above in which undesirably large steering forces are effectively eliminated for handling the vehicle, especially while standing still or while being parked.

Another object of the present invention resides in an independent suspension of a steered wheel of a motor vehicle which is simple in construction yet enables an arrangement which is effective to reduce the steering forces required to turn the wheels when the vehicle does not move.

Figure 2:
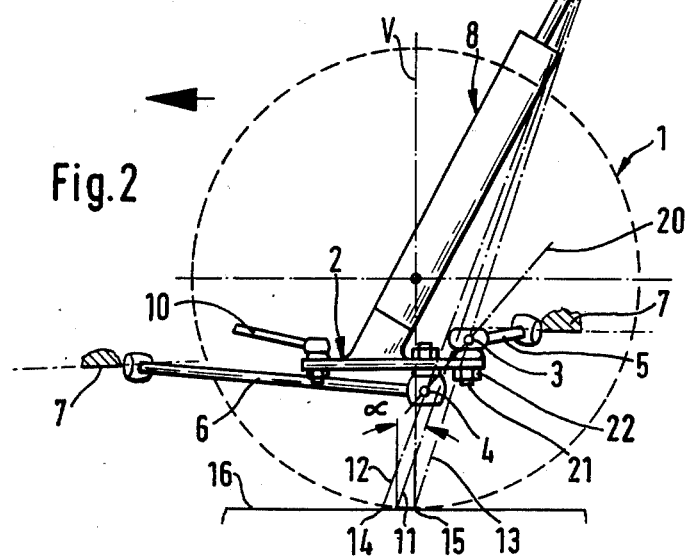

These and other objects, features and advantages of the present invention will become more apparent from the following description when taken in connection with the accompanying drawing which shows, for purposes of illustration only, one embodiment in accordance with the present invention, and wherein:

FIG. 1 is a perspective schematic view of the principle of a wheel suspension of the type of construction with which the present invention is concerned; and FIG. 2 is a somewhat schematic side elevational view of a wheel suspension in accordance with the present invention, as viewed approximately in the axial direction of the wheel.

Referring now to the drawing wherein like reference numerals are used throughout the two views to designate like parts, the steered wheel generally designated by reference numeral 1, of a passenger motor vehicle, is journaled or supported on a wheel carrier 2. For purposes of guidance of the wheel 1 during spring- and steering-movements, the wheel carrier 2 is connected with the vehicle body schematically indicated at 7 by way of two lower guide members 5 and 6 which are pivotally connected with the wheel carrier 2 one behind the other (as viewed in the longitudinal direction of the vehicle) in its lower area. The pivotal connection at the wheel carrier 2 takes place by way of ball joints, of which the joints 3 and 4 are illustrated. The two guide structures 5 and 6 act as lower wheel guide members whereas the spring and damping element generally designated by reference numeral 8 which is rigidly connected with the wheel carrier 2, serves as further wheel guide member for the wheel carrier 2. The spring and damping element 8 is connected with the vehicle body 7 by way of an upper joint having the joint point 9 for the purpose of the further guidance and support of the wheel 1. The steering movements are transmitted onto the wheel carrier 2 by way of the tie rod 10. The upper joint point 9 could also be formed by the joint of the apex of a triangular guide member (not shown) which, in its turn, would be pivotally connected again at the vehicle body in two further joints. However, the damping and spring element would then have to be pivotally connected, for example, with the wheel carrier and with the vehicle body.

For illustrating the present invention, the ideal steering axis 11 of the wheel 1 is shown in FIG. 1, which is formed by the line of intersection of the planes A and B which are defined by the axes of the two guide members 5 and 6 and the upper joint point 9. The ideal steering axis 11 is inclined with respect to the vertical for obtaining a castor angle $\alpha$ (FIG. 2). The lines passing through the upper joint point 9 and the lower joint points 3 and 4 are indicated in the drawing as effective axes of rotation 12 and 13 of the wheel 1. The points of intersection 14 and 15 of the axes of rotation 12 and 13 with the plane of the road surface 16 move during the steering of the wheel 1 along the indicated circles 17 and 18 about the points of intersection 21 and 19 of the pivot axes of the planes A and B extending through the upper joint points 9 and the inner points of pivotal connection of the lower guide members 5 and 6, with the plane of the road surface 16. The tire slides during the steering partly transversely to the tire center plane along the plane 16 of the road surface whereby higher steering forces have to be applied when the vehicle stands still or also, for example, during parking.

In order to reduce these forces to a minimum, the effective axes of rotation 12 and 13 are to be moved as close as possible to one another. For that purpose, the two lower joint points 3 and 4, in which the two lower guide members 5 and 6 engage at the wheel carrier 2, are arranged at different heights so that—as viewed in side view of the vehicle (FIG. 2)—the line of connection 20 of these joint points is inclined to the vertical V in the same sense as the ideal steering axis 11. As a result thereof, the effective axes of rotation 12 and 13 can be moved closer to one another than would be the case, for example, with joints 3 and 4 arranged at the same height, for the joint housings require structurally a certain minimum distance of the joint points from one another. As a result of the inclination of the connecting line 20 with respect to the vertical V in the same direction as the inclination of the ideal steering axis 11, the points of intersection 14 and 15 of the effective axes of rotation 12 and 13 can be moved even more close to one another than would be the case with an oppositely directed inclination of the connecting line 20. The closer the points of intersection 14 and 15 move toward one another, the smaller becomes also the distance of the axes of rotation 12 and 13 from the ideal steering axis 11 and the smaller will also become the aforementioned transverse movements during the steering. The proportion of the rolling movement of the tire during steering thereby increases which leads to a reduction of the steering forces during standstill or during parking.

As can be seen from FIG. 2, the fastening pins 21 of the ball joints provided at the two joint points 3 and 4 may extend approximately parallel to one another and may extend in opposite directions. In this manner, the effective axes of rotation 12 and 13 can be moved still more close toward one another without excessively impairing the accessibility of the nuts 22 for clamping fast the fastening pins 21.

Also such suspensions of the steered wheels fall within the scope of the present invention in which in lieu of the spring leg rigidly connected with the wheel carrier 2 and having only a single upper joint point 9 or in lieu of the aforementioned triangular guide structure as upper wheel guide member, for example, two upper guide members 23 and 24, as shown in dashed lines in FIG. 1, are provided which engage at the wheel carrier in separate places.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An independent suspension of a steered wheel of a motor vehicle, comprising wheel carrier means, two lower wheel guide means pivotally connected with the wheel carrier means in its lower area by lower joint means arranged one behind the other in the longitudinal direction of the vehicle, and upper guide means having at least one upper joint means for guiding the wheel during the spring and steering movements thereof, the ideal steering axis of the wheel which is represented by the line of intersection of the planes that are defined by the longitudinal axes of the two lower guide means and the upper joint means being inclined with respect to the vertical, as viewed in side view of the vehicle, for purposes of obtaining a castor angle, characterized in that the two lower joint means are so arranged at different heights that, as viewed in side view of the vehicle, the connecting line of these joint means is inclined with respect to the vertical in the same sense as the ideal steering axis.

2. A wheel suspension according to claim 1, characterized in that said two joint means include fastening pins that extend approximately parallel to one another.

3. A wheel suspension according to claim 2, characterized in that the fastening pins extend in opposite directions.

4. A wheel suspension according to claim 3, characterized in that the lower joint means include ball joints having said fastening pins.

5. A wheel suspension according to claim 4, characterized in that the upper guide means includes a spring leg rigidly connected with the wheel carrier means and pivotally connected at its upper end with the vehicle body by way of the upper joint means.

6. A wheel suspension according to claim 5, characterized in that the upper guide means further includes an upper substantially triangular guide member, and in that the spring leg is connected with the vehicle body by way of the upper triangular guide member which is pivotally connected with the spring leg by way of the upper joint means.

7. A wheel suspension according to claim 1, characterized in that the upper guide means includes a spring leg operatively connected with the wheel carrier means and pivotally connected at its upper end with the vehicle body by way of the upper joint means.

8. A wheel suspension according to claim 1, characterized in that the upper guide means further includes at least one upper guide member, and in that a spring leg is operatively connected with the vehicle body by way of the upper triangular guide member which is pivotally connected with the spring leg by way of the upper joint means.

9. A wheel suspension according to claim 8, characterized in that the upper guide member is a substantially triangularly shaped upper guide member pivotally connected with both the spring leg and the vehicle body.

10. A wheel suspension according to claim 1, characterized in that the upper guide means includes two upper guide members pivotally engaging at said wheel carrier means in separate places.

11. A wheel suspension according to claim 1, characterized in that the upper guide means includes a single ball joint.